(12) United States Patent
Bradd et al.

(10) Patent No.: US 6,434,229 B1
(45) Date of Patent: Aug. 13, 2002

(54) CHANNEL ASSOCIATED SIGNALLING (CAS) COMPATIBLE TELECOMMUNICATIONS NODE AND SOFTWARE PLATFORM THEREFOR

(75) Inventors: Patrick David Bradd, Cookham (GB); Brent Allan McDonald, Richmond (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/267,434

(22) Filed: Mar. 12, 1999

(30) Foreign Application Priority Data

Dec. 15, 1998 (GB) ............................... 9827597

(51) Int. Cl.[7] .......................... H04M 7/00; H04M 3/42; H04Q 7/00
(52) U.S. Cl. ................. 379/230; 379/229; 379/211.01; 370/328
(58) Field of Search ........................... 379/229, 211.01; 370/328

(56) References Cited

U.S. PATENT DOCUMENTS

| | | | | |
|---|---|---|---|---|
| 5,727,057 A | * | 3/1998 | Emery et al. | 379/211.01 |
| 5,818,824 A | * | 10/1998 | Lu et al. | 370/328 |
| 5,838,781 A | * | 11/1998 | Isaksson | 379/229 |
| 6,151,390 A | * | 11/2000 | Volftsun et al. | 379/229 |

* cited by examiner

Primary Examiner—Ahmad F. Matar
Assistant Examiner—Thjuan P. Knowlin
(74) Attorney, Agent, or Firm—Lee, Mann, Smith, McWilliam, Sweeney & Ohlson

(57) ABSTRACT

A Channel Associated Signalling (CAS) compatible telecommunications node, comprises an operating program in which CAS signalling information is separated from functional behaviour information which defines the behaviour of the node. Therefore, adjustment of the operation of the node can be achieved through datafill. The CAS signalling information and the functional behaviour information are stored in mapped look-up tables in which specific signalling information is mapped to corresponding node behaviour information.

9 Claims, 5 Drawing Sheets

CHANNEL ASSOCIATED SIGNALLING (CAS) COMPATIBLE TELECOMMUNICATIONS NODE AND SOFTWARE PLATFORM THEREFOR

This invention relates to a channel associated signalling (CAS) compatible telecommunications node and software platform therefor.

BACKGROUND OF THE INVENTION

There are two common digital communications formats; firstly T1 which is a 24 channel format utilised in the US and Japan and secondly E1 which is a 30 channel format utilised in the rest of the world. The T1 standard is set by the American National Standards Institute (ANSI) and runs at a clock rate of 1.544 Mbits/s. The E1 standard is set by CEPT (the conference of European postal and telecommunications administrations) and operates at a clock rate of 2.048 Mbits/s. In T1channels signalling is carried within each of the 24 time slots whereas in E1 channels signalling is carried within time slot 16.

Channel Associated Signalling (CAS)

CAS is a signalling protocol, the fundamentals of which will be explained in this section, with reference to FIG. 1, although many national variations apply. CAS protocols are approved by a number of standards bodies including ITU (International Telecommunications Union) and ETSI (European Telecommunications Standards Institute).

As mentioned above in the E1 format a connection is split in time into 32 individual time slots in which time slot "0" is used for frame signalling information and channel 16 is used for line signalling information. Register signalling is also incorporated on individual time slices as bearer information within the frame, or as pulsed charges in channel 16. Time slot or channel 16 is divided into sub-channels, each of which relate to the correspondingly numbered channel within the frame. Line signalling information regarding each of the channels within the frame is transmitted in channel 16 within the corresponding sub-channel. Each of these sub-channels transmits four bits of information, which for historic reasons are termed A, B, C and D bits.

These digital bits are utilised to indicate to the receiving node information such as:

The line is idle;
Trunk seizure is requested;
Trunk seizure is accepted;
Connection signal;
Clear signal;
Released signal;

In each of the different national GAS protocols different binary codes may be used to signify each of these requests, e.g. an "idle line" signal may be "00100" in one national CAS and "0101" in another national CAS, for example.

National CAS protocols may also differ in that a line signal may be continuous in some and pulsed in others. Also, register signals may be compelled that is a request is required in some systems and not in others. In some CAS systems a timer is set when a signal such as a request for a line is sent and a fault is determined when a response (either negative or positive) is not received within a predetermined time.

A very simplified process of making a telephone call utilising a compelled CAS protocol as discussed above is illustrated in the flow diagram of FIG. 2. This diagram is included to give an indication of the process through which a CAS protocol is used to make a call. However, it should be noted that this is a considerably simplified version and a host of information which is available through CAS such as billing information, metering information, call party status, for example, is not indicated.

With reference to FIG. 2 for a simple CAS protocol, when a channel, for example, channel 1 in a frame is not being utilised to make a call a line signal "Idle" signal is transmitted in the corresponding sub-channel 1 (block 40). If a first node (node A) wishes to utilise channel 1 it will send a "Seize (SZG)" signal in said sub-channel 1 (block 42). On receipt of this "Seize" signal at a connected node (node B) if the use of this channel is acceptable to node B, node B will send a "Seize acknowledge (SZA)" signal (block 44). On receipt of said "Seize acknowledge" signal node A will transmit a first digit of the telephone number of the telephone to which ultimately node A wishes to make a connection (block 46). This is the first register signalling signal which is sent on the channel 1 as opposed to the sub-channel 1 within channel 16. On receipt of said first digit of a telephone number node B will send a request for the next digit of a telephone number (block 48).

These requests and telephone digits are transmitted until node A sends the final digit of a telephone number (block 50) at which point node B may connect the line to the telephone in question and send a "Connect Call Charge" signal to node A (block 52). After the telephone in question is placed off-hook an answer signal may be sent by node B to node A (block 54) and voice communication on channel 1 of the time frame may be established between the two nodes (block 56). This will continue until the phone is placed on-hook again at which point node A will send a "Clear Forward" signal to node B (block 58) upon receipt of which node B will send a "Release Guard" signal to node A (block 60). At this point both nodes will continue to retransmit the original idle signal (block 40).

In FIG. 2, the indication as to whether or not signals are commonly line signals or register signals is indicated by the letter L or R to the left of the blocks. Line signalling is commonly utilised for control information whereas register signalling is typically utilised for call information. Different systems may be used although a common one is a dual tone multi-frequency system transmitted along the individual time frames.

As was discussed above, the binary line signal codes or tones for each of these signals may be different in different national CAS protocols and the duration for which they are transmitted may be different. The time interval before a reply or response is expected may be different and the overall waveform used in each signal may be different.

In known systems the operation of a node in compliance with the national CAS standard is determined by hard coding the operation of the node which requires a massive amount of rewriting of software in order to adjust a node for operation in compliance with a different national standard. For example, in order to provide a digital switch for use in a country utilising a CAS protocol for the first time, may take six or more months of intense software development as well as a vast amount of finance and manpower. Therefore, it is a huge commercial problem for telecommunications companies wishing to sell a client a switch for a new country if software has to be rewritten so that the switch will operate in that country. To date no solution to this problem has been found. Also, as there are so many legacy switches and PBXs in the field all operating on different national CAS protocols, CAS signalling can not be completely superseded by other protocols such as CSS7 or PRI.

SUMMARY OF THE INVENTION

It is therefore an object of the present invention to provide a CAS software platform which allows flexible relatively fast and relatively low cost CAS development.

It is a further object of the present invention to provide a CAS software platform which allows easy extension for new functionality.

It is a further object of the present invention to provide a telecommunications node and a system comprising said nodes with the aforementioned CAS software platform characteristics.

According to a first aspect of the present invention there is provided a Channel Associated Signalling (CAS) compatible telecommunications node, comprising an operating program in which CAS signalling information is separated from functional behaviour information which defines the behaviour of the node, such that adjustment of the operation of the node can be achieved through datafill.

Preferably, the CAS signalling information and the functional behaviour information are stored in mapped look-up tables in which specific signalling information is mapped to corresponding node behaviour information.

Most preferably, the CAS signalling information includes line signalling information and register signalling information. Preferably, the CAS signalling information also includes signalling waveform characteristics.

Preferably, the node behaviour information includes actions to be taken by the node in receipt of specific CAS signals and protocol timing characteristics.

Preferably, additional functionality can be added to the node by datafilling both the signalling information look-up table and the node behaviour look-up table with the necessary information and mapping the new information as required. In one embodiment the node is a switch. In another embodiment the node is a private branch exchange (PBX).

According to a second aspect of the present invention there is provided a Channel Associated Signalling (CAS) compatible telecommunications system comprising at least two CAS compatible telecommunications nodes, wherein each node comprises a CAS software platform in which CAS signalling information is separated from functional behaviour information which defines the behaviour of the node, such that adjustment of the operation of the node can be achieved through datafill.

According to a third aspect of the present invention there is provided Channel Associated Signalling (CAS) software platform, for control of a CAS compatible telecommunications node, in which CAS signalling information is separated from functional behaviour information which defines the behaviour of the node, such that adjustment of the operation of the node can be achieved through datafill.

According to a fourth aspect of the present invention there is provided a method of manufacture of a Channel Associated Signalling (CAS) compatible telecommunications node comprising the steps of:

storing CAS signalling information and corresponding node behaviour information in separate look-up tables;

mapping entries in the signalling information table to corresponding entries in the node behaviour table; and adjusting the operation of the node by altering selected entries in either of the look-up tables.

Preferably, the method includes creating a framework software platform containing International telecommunications Union ITU-R2 standard compatible signalling information and node behaviour in respective look-up tables and adjusting the tables in order to conform to separate national variations on the aforementioned standard.

The method of claim 16, wherein additional functionality can be added to the node by datafilling both the signalling information look-up table and the node behaviour look-up table with the necessary information and mapping the new information as required.

It is an advantage of the present invention that the software platform enables a quick and easy ,means of defining the operation of the node to comply with the specific task protocol through datafill.

It is a further advantage of the present invention that adjustments for national CAS protocols may be made via datafill.

BRIEF DESCRIPTION OF THE DRAWINGS

These and other objects, aspects, features and advantages of the invention will become more apparent from the following detailed description, claims and drawings, in which:
FIG.

DETAILED DESCRIPTION OF THE INVENTION

Figure 1:
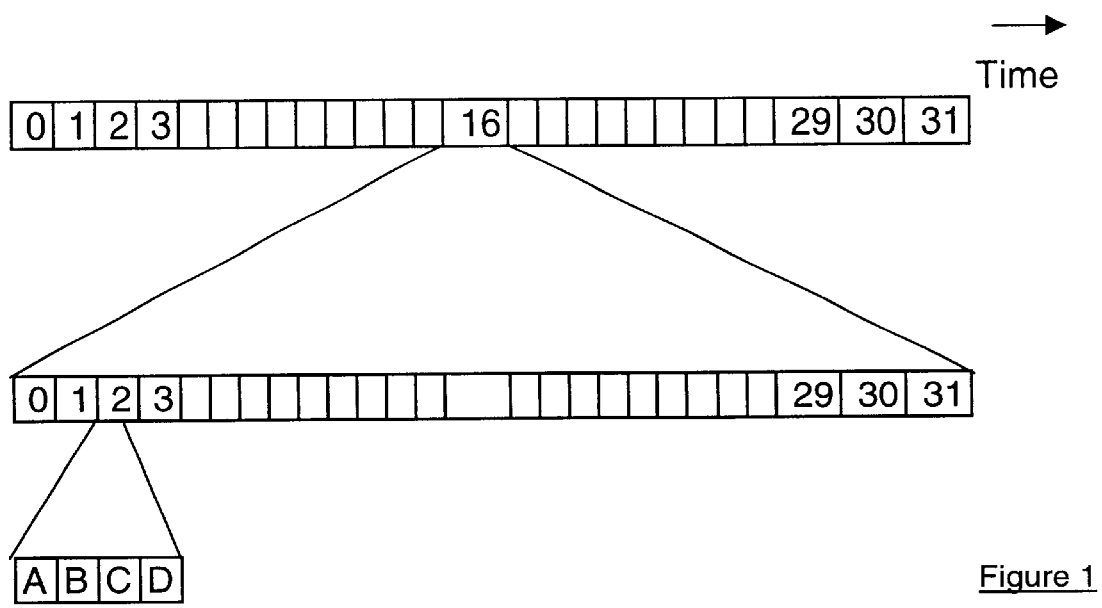
FIG. 1 is a schematic illustration of an E1 time frame.
Figure 2:
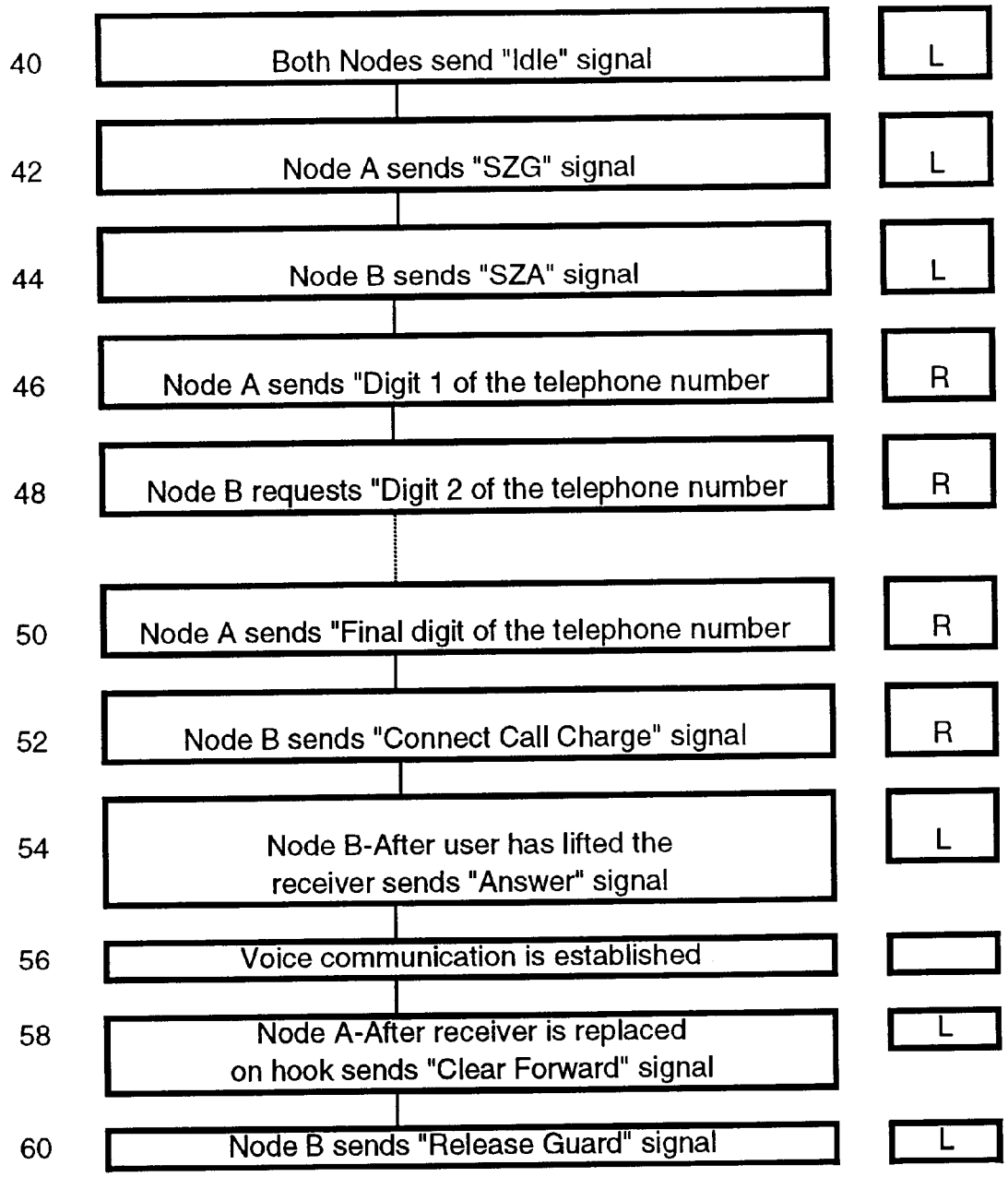
FIG. 2 is a simplified flow chart of the actions required within a CAS protocol to make a telephone call.
Figure 3:
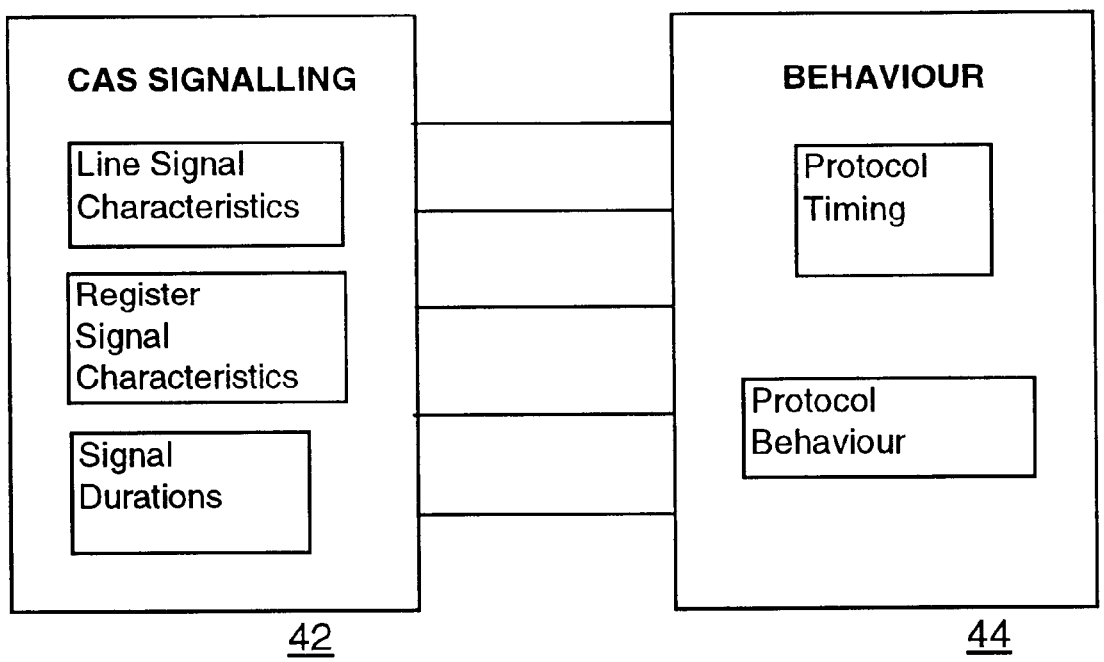
FIG. 3 is a simplified schematic of the datafill tables utilised in accordance with the present invention.
Figure 4:
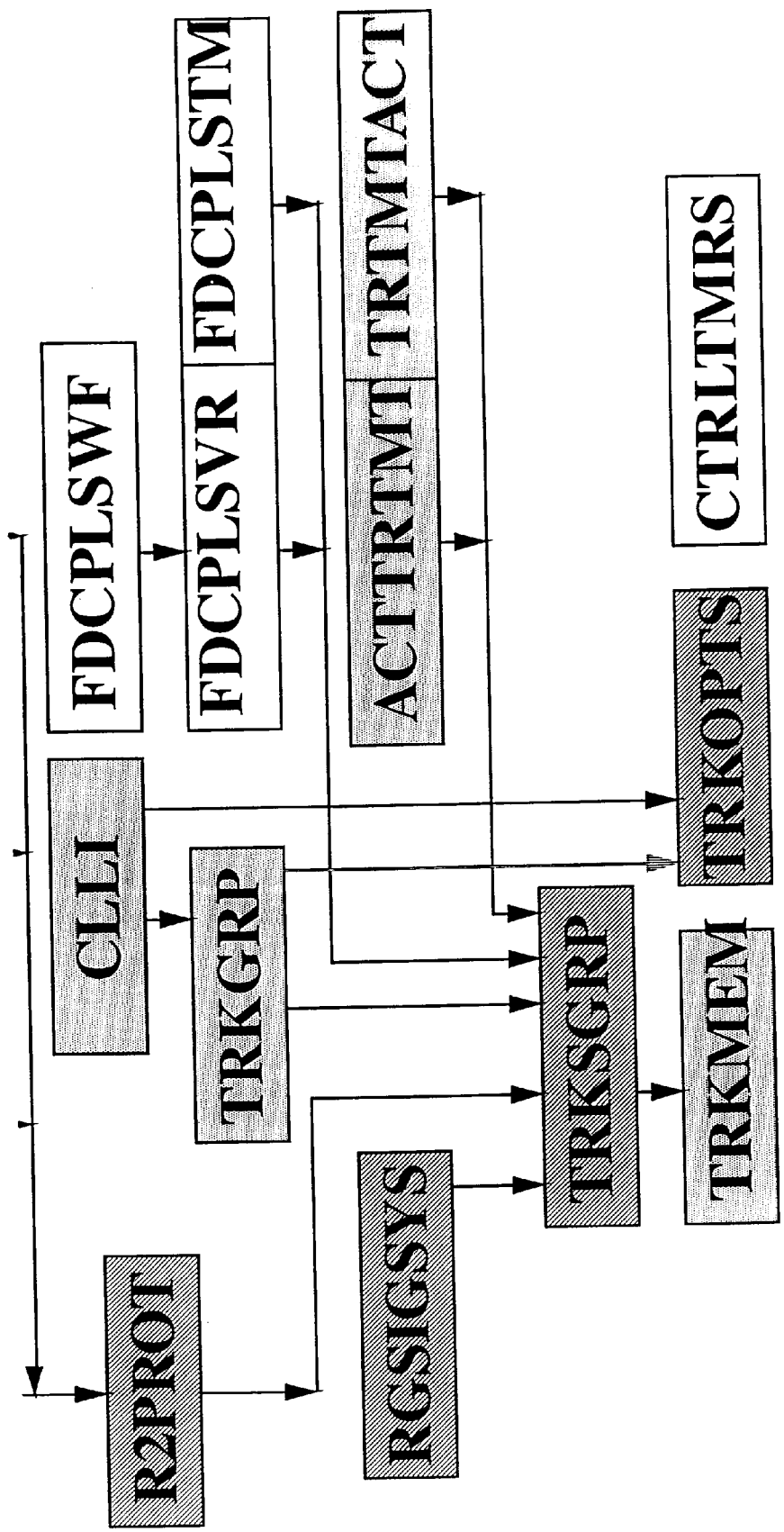
FIG. 4 is a more detailed illustration of some specific datafill tables which may be utilised in accordance with the present invention.
Figure 5:
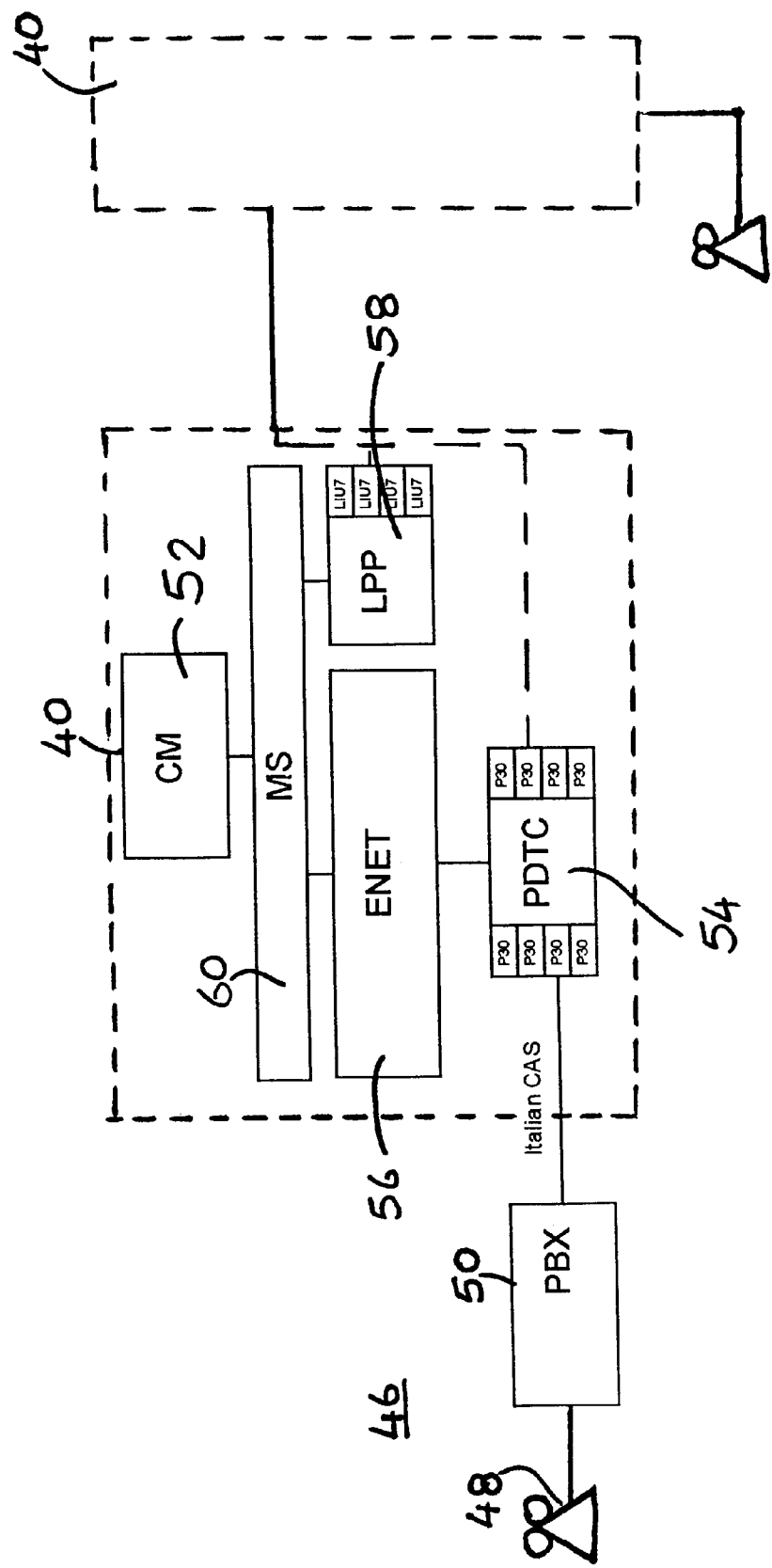
FIG. 5 is an illustration of a telecommunications system in accordance with the present invention.

Referring to FIGS. 3, 4 and 5 there is presented an embodiment of a CAS compatible telecommunications node 40 which comprises a CAS software platform in which CAS signalling information is separated from functional behaviour information which defines the behaviour of the node. Therefore, adjustment of the operation of the node can be achieved through datafill. The CAS signalling characteristics and functional behaviour information are stored in mapped lookup tables 42 and 44 (FIG. 3) respectfully in which signalling characteristics are mapped to corresponding node behaviour information.

The signalling characteristics includes line signal characteristics, register signal characteristics, signal duration and timing information. Thus when a specific line signal is received from the node that line signal can be determined in the first lookup table 42 and mapped to the corresponding behavioural information in the second lookup table 44. For example, if a channel request signal is received the timing table in table 44 can be checked to see the time in which a response must be transmitted and the action table can be interrogated to determined what that response should be.

In some CAS protocols, for example, when a first digit of a telephone number is received a signal is transmitted to request the second digit. In other CAS systems no such request is transmitted and the second digit is merely awaited. These two options would be embodied in the appropriate lookup tables of embodiments of the present invention as required by the national CAS protocol in the country in which the node is to be used.

Furthermore, if an additional functionality is to be added to a node then the necessary signalling information and behavioural information is datafilled into the appropriate lookup tables in order to implement the new functionality, as required.

Commonly the node will be a digital switch such as the Nortel DMS (trade mark) although the node may be a private branch exchange (PBX) or other commonly utilised telecommunications node. The term "node" is intended to define the point between telecommunications links wherein a telecommunications signal is analysed for switching.

FIG. 4 illustrates a more detailed embodiment of the lookup tables utilised in a practical DMS switch in which the tables have specific functions as detailed below.

Tables DGHEAD and DGCODE

Relates to Digit Analysis data used to decide when enough digit information has been received to determine outgoing trunk selection.

Table SIGACT

Maps register signalling signals (tones) to register signalling activities (high level protocol events). This is used when tones are received.

Table ACTSIG

Maps register signalling activities (high level protocol events) to register signalling signals (tones). This is used when tones are being sent.

Table ACTCTL

Maps register signalling activities (high level protocol events) to register signalling phase changes.

Table ACTTRMT

Maps register signalling activities (high level protocol events) to treatments to be applied in the backwards direction (such as subscriber busy, for example).

Table TRMTACT

Maps treatments to register signalling activities (high level protocol events) to be sent in the backwards direction (such as subscriber busy, for example).

Table CATCLASS

Defines category functionality—i.e. calling (subscriber), billing or both.

Table R2PROT

Ties together the relevant tables from tables SIGACT, ACTSIG, ACTCT, CATCLASS, plus some optional information for handling of digits #B to #F, and toll-break-in functionality.

Table CLLI

Provides CLLI definitions for tying trunks of the same characteristics and destinations together.

Table TRKGRP

Provides various miscellaneous functions.

Table RGSIGSYS

Provides timing parameters for register signalling (including inter-digit timing).

Table FDCPLSWF

Provides line signalling signal (waveform) data including the nature of the waveform (pulsed or continuous), the ABCD bit pattern for each stage of the waveform, the number of times to repeat the waveform (if pulsed), timing for each stage of the waveform, tolerances for waveform reception (if pulsed). This table also provides dial pulsed characteristics (if DP used for the protocol), ABCD masking values, ABCD hardware filtering times, signal error detection times.

Table FDCPLSVR

Provides optional line signalling behaviour (such as the use of metering, operator signals, if a SZA is needed), and an index into FDCPLSWF.

Table FDCPLSTM

Provides line signal protocol timer durations (such as the length of time to wait for a SZA or a release acknowledgement before timing out).

Table TRKGRSGP

Ties together tables from tables RGSIGSYS, R2PROT, TRKGRP, ACTTRMT, TRMTACT, FDCPLSVR, FDCPLSTM, DGHEAD and DGCODE. This table also provides the type of register signalling to be employed (multi-frequency compelled, multi-frequency pulsed, MF, DTMF, dial pulsed (using timeslot 16 line signals)), end-to-end or link by link register signalling, overlap handling functionality and glare handling functionality, Table TRKMEM Provides information about an individual trunk member (a timeslot on a carrier).

Table TRKOPTS

Provides information for functionality which does not fit into other tables.

Table CTRLTMRS

Provides protocol timing information that does not fit in other tables.

FIG. 5 illustrates a CAS compatible telecommunications system 46 comprising two CAS compatible nodes 40 in the form of digital switches. Each of the nodes 40 comprises a software platform as discussed above. In this embodiment a telephone 48 is connected to the first switch 40 via a PBX 50 and a second phone 48 is directly connected to the second switch 40.

FIG. 5 provides a typical view of a digital switch used for trunking. The CAS implementation provided uses much of the hardware involved, but not all of it directly.

In each switch 40 the CM (Computing Module) 52 provides software control for all aspects of the switch.

The PDTC (PCM30 digital trunk controller) 54 provides hardware access and software control for low-level CAS protocol functions.

The ENET (Enhanced network) 56 provides a switching matrix for connecting different trunks, or trunks to lines as is known in the art.

The LPP 58 provides C7 signalling functionality for C7 trunks. It is not used for CAS trunks, but is used for a CAS to C7 or C7 to CAS call.

The MS (message switch) 60 provides a messaging system for CM / PDTC / ENET / LPP communication.

Modifications may be incorporated without departing from the scope or spirit of the present invention.

What is claimed is:

1. A channel associated signalling (CAS) compatible communications node arranged to operate with any selected one of a plurality of different CAS protocol variants, said node comprising a software platform supporting node operating software and in which CAS signalling information relating to a CAS protocol variant is separated from functional behavioural information defining the behaviour of the node, wherein said signalling information and functional behavioural information are stored in respective first and second mapped lookup tables such that the CAS variant signalling characteristics are mapped to corresponding node behaviour, and wherein operation of the node in a manner compatible with said CAS protocol variant is provided, without modification to said node operating software, by datafilling said first and second mapped lookup tables with data relating specifically to that CAS protocol variant.

2. The telecommunications node of claim 1, wherein the CAS signalling information includes line signalling information.

3. The telecommunications node of claim 1, wherein the CAS signalling information includes register signalling information.

4. The telecommunications node of claim 1, wherein the CAS signalling information includes signalling waveform characteristics.

5. The telecommunications node of claim 1, wherein the node behaviour information includes actions to be taken by the node in receipt of specific CAS signals.

6. The telecommunications node of claim 1, wherein the node behaviour information includes protocol timing characteristics.

7. The telecommunications node of claim 1, wherein additional functionality can be added to the node by datafilling both the signalling information look-up table and the node behaviour look-up table with the necessary information and mapping the new information as required.

8. The telecommunications node of claim 1, wherein the node is a switch.

9. The telecommunications node of claim 1, wherein the node is a private branch exchange (PBX).

* * * * *